(12) United States Patent
Helbing et al.

(10) Patent No.: US 12,119,984 B2
(45) Date of Patent: *Oct. 15, 2024

(54) TECHNIQUES FOR DYNAMIC NETWORK RESILIENCY

(71) Applicant: Capital One Services, LLC, McLean, VA (US)

(72) Inventors: Lindsay Helbing, Newport News, VA (US); Bryan Pinos, Williamsburg, VA (US); Eric Barnum, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/211,096

(22) Filed: Jun. 16, 2023

(65) Prior Publication Data
US 2024/0064056 A1 Feb. 22, 2024

Related U.S. Application Data

(63) Continuation of application No. 17/237,795, filed on Apr. 22, 2021, now Pat. No. 11,683,217, which is a
(Continued)

(51) Int. Cl.
| | |
|---|---|
| *H04L 41/0659* | (2022.01) |
| *H04L 41/0631* | (2022.01) |
| *H04L 41/0816* | (2022.01) |
| *H04L 41/0859* | (2022.01) |
| *H04L 41/0893* | (2022.01) |
| *H04L 41/0896* | (2022.01) |

(Continued)

(52) U.S. Cl.
CPC ...... *H04L 41/0661* (2023.05); *H04L 41/0645* (2013.01); *H04L 41/0816* (2013.01); *H04L 41/0859* (2013.01); *H04L 41/0893* (2013.01); *H04L 41/0896* (2013.01); *H04L 43/0894* (2013.01); *H04L 41/12* (2013.01); *H04L 41/22* (2013.01)

(58) Field of Classification Search
None
See application file for complete search history.

(56) References Cited

U.S. PATENT DOCUMENTS

| | | | |
|---|---|---|---|
| 6,442,754 B1 * | 8/2002 | Curtis | G06F 8/62 707/999.107 |
| 7,292,531 B1 | 11/2007 | Hill | |

(Continued)

*Primary Examiner* — Lashonda Jacobs-Burton
(74) *Attorney, Agent, or Firm* — KDW Firm PLLC

(57) ABSTRACT

Various embodiments are generally directed to techniques for dynamic network resiliency, such as by monitoring and controlling the configuration of one or more network components to ensure proper endpoint alignment, for instance. Some embodiments are particularly directed to a tool (e.g., resiliency agent) that can automatically recognize symptoms of issues with a network component, such as autoscaling, latency, traffic spikes, resource utilization spikes, etcetera, and respond appropriately to ensure continued and optimized operation of the network component. In many embodiments, the tool may dynamically reroute endpoint traffic, perform traffic balancing, and/or drive autoscaling to optimize operation of the network component in response to recognizing symptoms.

20 Claims, 7 Drawing Sheets

Related U.S. Application Data continuation of application No. 16/744,946, filed on Jan. 16, 2020, now Pat. No. 11,018,927, which is a continuation of application No. 16/409,269, filed on May 10, 2019, now Pat. No. 10,587,457.

(51) Int. Cl.
*H04L 43/0894* (2022.01)
*H04L 41/12* (2022.01)
*H04L 41/22* (2022.01)

(56) References Cited

U.S. PATENT DOCUMENTS

| | | | |
|---|---|---|---|
| 7,324,553 B1 | 1/2008 | Varier et al. | |
| 7,386,752 B1* | 6/2008 | Rakic | G06F 11/1469 |
| | | | 714/2 |
| 7,457,870 B1 | 11/2008 | Lownsbrough et al. | |
| 9,070,086 B2* | 6/2015 | Garg | G06Q 50/182 |
| 9,430,359 B1* | 8/2016 | Troutman | G06F 11/0793 |
| 10,176,081 B1* | 1/2019 | Webb | G06F 11/3495 |
| 10,644,954 B1* | 5/2020 | Pinos | H04L 47/2483 |
| 10,713,108 B2* | 7/2020 | Thomas | G06N 20/00 |
| 2005/0144188 A1* | 6/2005 | Bailey | G06Q 10/0639 |
| 2008/0082974 A1* | 4/2008 | Ellison | G06F 8/71 |
| | | | 717/170 |
| 2009/0281819 A1* | 11/2009 | Garg | G06Q 50/182 |
| | | | 706/50 |
| 2010/0220584 A1* | 9/2010 | DeHaan | H04L 41/0846 |
| | | | 370/216 |
| 2012/0005646 A1* | 1/2012 | Manglik | G06F 9/4856 |
| | | | 717/176 |
| 2012/0023154 A1* | 1/2012 | Demant | H04L 67/01 |
| | | | 709/219 |
| 2013/0191524 A1* | 7/2013 | Dupre | H04L 43/10 |
| | | | 709/223 |
| 2013/0239089 A1* | 9/2013 | Eksten | G06F 8/20 |
| | | | 717/120 |
| 2015/0120359 A1* | 4/2015 | Dongieux | G06F 16/285 |
| | | | 705/7.15 |
| 2016/0117646 A1* | 4/2016 | Lerick | G06Q 10/1095 |
| | | | 705/7.21 |
| 2016/0246575 A1* | 8/2016 | Baluch | G06F 8/427 |
| 2016/0261459 A1* | 9/2016 | Kamath | H04L 67/34 |
| 2017/0034010 A1* | 2/2017 | Fong | H04L 67/10 |
| 2017/0168797 A1* | 6/2017 | Pogrebinsky | G06F 8/65 |
| 2017/0195201 A1* | 7/2017 | Mueller | H04L 43/16 |
| 2017/0281676 A1* | 10/2017 | Adhami | A61K 33/36 |
| 2018/0225133 A1* | 8/2018 | Kuroda | G06F 9/44505 |
| 2018/0367399 A1* | 12/2018 | Pani | H04L 61/5046 |
| 2019/0068467 A1* | 2/2019 | Chauhan | G06F 11/3452 |
| 2019/0158408 A1 | 5/2019 | Li et al. | |
| 2020/0106741 A1 | 4/2020 | Fandli | |

* cited by examiner

100

200

400

500

700

TECHNIQUES FOR DYNAMIC NETWORK RESILIENCY

RELATED APPLICATION

This application is a continuation of U.S. patent application Ser. No. 17/237,795, filed on Apr. 22, 2021, now U.S. Pat. No. 11,683,217, which is a continuation of U.S. patent application Ser. No. 16/744,946, filed on Jan. 16, 2020, now U.S. Pat. No. 11,018,927, which is a continuation of U.S. patent application Ser. No. 16/409,269, now U.S. Pat. No. 10,587,457, filed on May 10, 2019. The contents of the aforementioned applications are incorporated herein by reference in their entirety.

BACKGROUND

Generally, a computer network is a digital telecommunications network which allows nodes, or components, to share resources. In computer networks, computing devices exchange data with each other using connections between nodes via various transmission media, such as via wired or wireless mediums. Computer networks can support a large number of applications and services such as access to the World Wide Web, digital video, digital audio, and shared use of application and storage servers. The amount of data moving across a computer network may be referred to as traffic. Typically, network data in computer networks is encapsulated in network packets, which provide the traffic load in the network. Generally, network management may include one or more of network traffic control, network traffic measurement, network traffic simulation, network traffic modeling, and network configuration.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

Various embodiments described herein may include an apparatus comprising a processor and a memory comprising instructions that when executed by the processor cause the processor to perform operations comprising one or more of: monitor operation of a plurality of components implemented by a set of networked resources; detect an issue with a component in the plurality of components based on monitored operation of the component; access a component registry corresponding to the component, the component registry located in a configuration registry for the plurality of components implemented by the set of networked resources, and the component registry comprising one or more configurations for the component, one or more dependency sets for the component, and one or more dependency configurations corresponding to the one or more dependency sets of the component; analyze the issue with the component to select a configuration of the one or more configurations for the component to resolve the issue with the component; identify a dependency set of the one or more dependency sets and a dependency configuration of the one or more dependency configurations based on the configuration of the one or more configurations selected to resolve the issue with the component, the dependency set comprising one or more dependent upstream or downstream components to the component with the issue and the dependency configuration comprising configurations for the one or more dependent upstream or downstream components to the component; apply the configuration to resolve the issue with the component; and apply the dependency configuration to the dependency set to prevent dependency issues resulting from application of the configuration to resolve the issue with the component.

One or more embodiments described herein may include at least one non-transitory computer-readable medium comprising a set of instructions that, in response to being executed by a processor circuit, cause the processor circuit to perform operations comprising one or more of: detect an issue with an application program interface (API) of a plurality of APIs implemented by a set of networked resources; select a configuration of one or more configurations for the API in a configuration registry to resolve the issue with the API, the configuration registry comprising a component registry for each of the plurality of APIs implemented by the set of networked resources and each component registry comprising one or more configurations for a respective API, one or more dependency sets corresponding to the respective API, and one or more dependency configurations corresponding to the one or more dependency sets corresponding to the respective API; identify a dependency set of the one or more dependency sets and a dependency configuration of the one or more dependency configurations based on the configuration selected to resolve the issue with the API, the dependency set comprising one or more dependent upstream or downstream APIs to the API with the issue and the dependency configuration comprising configurations for the one or more dependent upstream or downstream APIs; apply the configuration to resolve the issue with the API; and apply the dependency configuration to the dependency set to prevent dependency issues resulting from application of the configuration to resolve the issue with the API.

Some embodiments described herein may include a computer-implemented method, comprising one or more of: analyzing a plurality of components and a set of networked resources utilized to implement the plurality of components; and building a configuration registry based on analysis of the plurality of components and the set of networked resources, the configuration registry comprising a component registry for each of the plurality of components implemented by the set of networked resources and each component registry comprising one or more configurations for a respective component, one or more dependency sets corresponding to the respective component, and one or more dependency configurations corresponding to the one or more dependency sets corresponding to the respective component, wherein each of the one or more configurations for the respective component comprises one or more settings to resolve at least one operational issue with the respective component, each dependency set in a respective component registry comprises one or more dependent upstream or downstream components to the component associated with the respective component registry, and each dependency configuration in the respective component registry comprises configurations for the one or more dependent upstream or downstream components to prevent dependency issues resulting from application of a configuration to resolve an operational issue with the component associated with the respective component registry; identifying a change to the plurality of components or the set of networked resources utilized to implement the plurality of components; and updating the configuration registry based on the change to the plurality of components or the set of networked resources utilized to implement the plurality of components.

DETAILED DESCRIPTION

Figure 1:
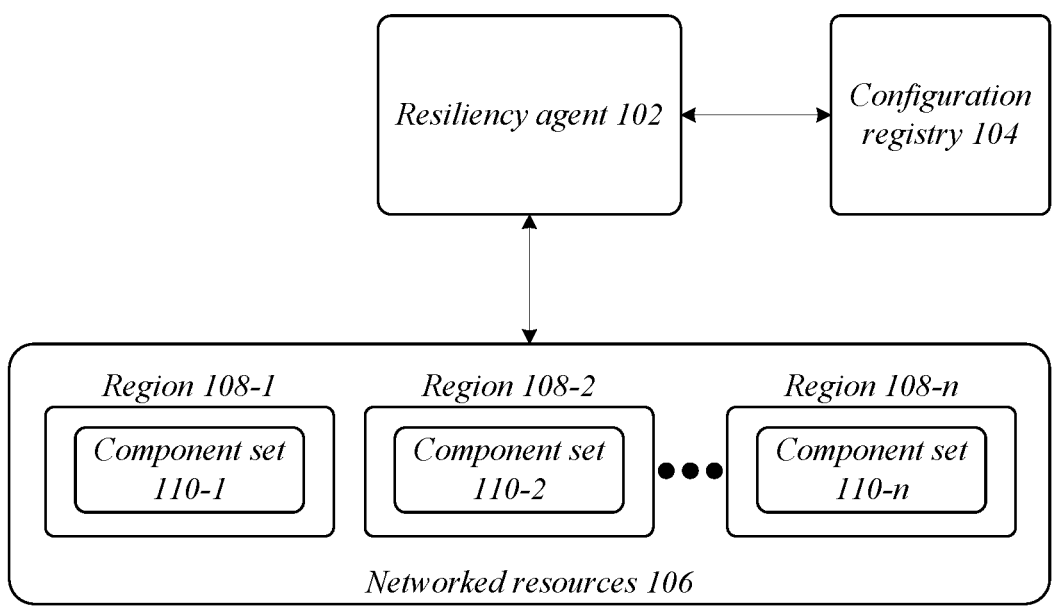
FIG. 1 illustrates an embodiment of a first operating environment according to one or more embodiments described herein.

Various embodiments are generally directed to techniques for dynamic network resiliency, such as by monitoring and controlling the configuration of one or more network components to ensure proper endpoint alignment, for instance. Some embodiments are particularly directed to a tool (e.g., resiliency agent) that can automatically recognize symptoms of issues with a network component, such as autoscaling, latency, traffic spikes, resource utilization spikes, etcetera, and respond appropriately to ensure continued and optimized operation of the network component. In many embodiments, the tool may dynamically reroute endpoint traffic, perform traffic balancing, and/or drive autoscaling to optimize the operation of the network component in response to recognizing symptoms. These and other embodiments are described and claimed.

Some challenges facing network management include relocating network components and/or rerouting traffic flows associated with the network components without adversely affecting the operation of the network components and/or associated traffic flows. For example, moving a network component from a first network region to a second network region may interrupt endpoint alignment, causing errors with the network component interoperating with one or more other network components in the first or second network regions. These challenges may result from complex interdependencies between various network components. For instance, a network node may provide and/or utilize a functionality to other up and downstream network nodes (e.g., via an application program interface (API)). In such instances, relocating the network node from a first region to a second region may require the network node to be reconfigured to ensure it is properly connected to its upstream and downstream dependencies. Adding further complexity, identification and maintenance of network interdependencies (e.g., maintaining endpoint alignment) is typically a time-consuming and primarily manual process. Especially, when various network components are siloed. For instance, loss of endpoint alignment may require manual reset/reconfiguration. These and other factors may result in network management with limited scalability, deficient performance, poor adaptability, and insufficient ability to provide optimal and efficient network operation. Such limitations can drastically reduce the capabilities, usability, and applicability of components in the network, contributing to inefficient systems with limited capabilities and excessive downtime.

Various embodiments described herein include a resiliency agent that can automatically recognize component issues and reconfigure the component, or traffic routing associated therewith, as needed to optimize network performance, correct issues, and maintain the quality of service (QoS). For example, the resiliency agent may monitor and maintain endpoint alignment among various interdependent network components. In another example, the resiliency agent may allocate additional networked resources (e.g., to implement additional compute instances) to maintain QoS and prevent one or more network components from being overloaded. In some embodiments, the resiliency agent may include, create, and/or maintain a registry of network configurations for each component.

In many embodiments, the registry of network configurations may include a configuration table that identifies upstream and/or downstream dependencies. In many such embodiments, the resiliency agent may register network components along with any associated configuration rules. In various embodiments, the registry may include up and downstream dependencies of one or more components. In several embodiments, active capability, such as with respect to components or regions of the network, may be noted along with pre-scripted code to initialize traffic rerouting and activation of appropriate regional endpoints. In one or more embodiments, resiliency agent may provide user-initiated controls to simulate errors/failures of network components. In one or more such embodiments, these controls may enable testing, such as for resiliency, in either production or simulated production environments (e.g., a copy system).

In some embodiments, the resiliency agent may identify and map interdependency chains for one or more portions of a network. In some such embodiments, the resiliency agent may identify and/or correct one or more weaknesses in an interdependency chain. In one or more embodiments, the resiliency agent may generate one or more graphical representations of network configurations and dependencies. In one or more such embodiments, the graphical representations may be present via a user interface. In various embodiments, the graphical representations may facilitate better comprehension of network configuration and/or compare an actualized network with its intended design.

In these and other ways the resiliency agent may increase efficiency, improve performance, and/or reduce downtime of networks, or components thereof, in an accurate, robust, efficient, dynamic, and scalable manner, resulting in several technical effects and advantages over conventional computer technology, including increased capabilities and improved adaptability. In various embodiments, the resiliency agent may be implemented in a practical application via one or more computing devices, and thereby provide additional and useful functionality to the one or more computing devices, resulting in more capable, better functioning, and improved computing devices. In many embodiments, the resiliency agent may make interdependencies and configurations of network components more accessible by providing familiar, user-friendly interface objects, such as to visualize and/or interact with component mappings.

In several embodiments, resiliency agent may provide specific and particular manners of automatically monitoring and controlling network configurations and allocations, such as to maintain endpoint alignment. In one or more embodiments, the resiliency agent may be implemented as a set of rules that improve computer-related technology by allowing a function not previously performable by a computer that enables an improved technological result to be achieved. In one or more such embodiments, the function may include automatically identifying and correcting network configurations and/or allocations as an improved technological result. In some embodiments, the resiliency agent may enable a computing device to improve robustness and increase performance of networks, or components thereof, such as by efficiently and automatically correcting network configurations.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given. For instance, in some embodiments, a machine may include a virtual machine implemented on a computing platform.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1 illustrates an embodiment of an operating environment 100 according to one or more embodiments described herein. Operating environment 100 may include resiliency agent 102, configurations registry 104, and networked resources 106. In the illustrated embodiment, networked resources 106 may include one or more regions 108-1, 108-2, 108-$n$ and each of the one or more regions may include a component set 110-1, 110-2, 110-$n$ of one or more network components. In one or more embodiments described herein, resiliency agent 102 may operate to recognize and correct symptoms or issues with components in, or implemented by, networked resources 106. For instance, resiliency agent 102 may monitor traffic and/or logs to identify issues with components and implement corrective actions. In many embodiments, resiliency agent 102 may build and/or utilize configuration registry 104, such as to select corrective actions. In many such embodiments, configuration registry 104 may include a configuration table for network components that identify upstream and/or downstream dependencies for the network components. Embodiments are not limited in this context.

In various embodiments, resiliency agent 102 may identify issues with a component, such as misconfigurations or excessive traffic flow, and automatically reconfigure them as needed to optimize network performance, correct issues, and maintain quality of service (QoS). For example, the resiliency agent 102 may monitor and maintain endpoint alignment among various components in, or implemented by, networked resources 106. In a further example, resiliency agent 102 may detect up or down spikes in traffic and logged errors specific to an API and dynamically implement either regional activation or failover based on pre-configuration of the API to work in other regions, as well as, trigger appropriate instances and autoscaling to support the failover.

In one or more embodiments described herein, an issue with a network component may include one or more operating conditions or settings that cause or have the potential to cause limited or unintended functionality associated with networked resources 106 (e.g., an error or warning). In one or more such embodiments, the issues may include a symptom identified by the resiliency agent 102. In some embodiments, the resiliency agent 102 may allocate additional networked resources to maintain QoS and prevent one or more network components from being overloaded. For example, resiliency agent 102 may cause additional compute instances to be instantiated to support the additional load. In some embodiments, the resiliency agent 102 may utilize, create, and/or maintain the configuration registry 104.

In many embodiments, the configuration registry 104 can include a configuration table that identifies upstream and/or downstream dependencies. In many such embodiments, the resiliency agent 102 may register network components along with any associated configuration rules in configuration registry 104. In some embodiments, the configuration registry 104 may enable resiliency agent 102 to gain an overview of the network components layout, even when different components are siloed. In various embodiments, the configuration registry 104 may include up and down stream dependencies of one or more components of networked resources 106. In several embodiments, active capability, such as with respect to components in components sets 110-1, 110-2, 110-$n$ or regions 108-1, 108-2, 108-$n$ of the network comprising networked resources 106, may be noted along with pre-scripted code to initialize traffic rerouting and activation of appropriate regional endpoints. In one or more embodiments, resiliency agent 102 may provide user-initiated controls to simulate errors/failures of network components. In one or more such embodiments, these controls may enable testing, such as for resiliency, in either production or simulated production environments (e.g., a copy system).

In some embodiments, the resiliency agent 102 may identify and map interdependency chains for one or more portions of a network. In some such embodiments, the resiliency agent 102 may identify and/or correct one or more weaknesses in an interdependency chain. In one or more embodiments, the resiliency agent may generate one or more graphical representations of network configurations and dependencies. In one or more such embodiments, the graphical representations may be presented via a user interface. In various embodiments, the graphical representations may provide visualizations of network configurations and/or comparisons of an actualized network with its intended design.

In one or more embodiments, the networked resources 106 may comprise, or be comprised in, a computer network that includes physical resources and/or cloud resources. In various embodiments, physical resources may include physical hardware that are directly controlled, employed, and/or owned by an entity that provides the services and or applications implemented by the set of networked resources 106. In many embodiments, cloud resources may refer to a pool of hardware that is utilized to provide computational or data services to the entity without the entity having physical access or control over the hardware providing the computational or data services. For example, cloud resources may include computational or data services utilized (e.g., under a rental agreement) by the entity independent of the underlying hardware. In several embodiments, the networked resources 106 may be divided into one or more regions 108-1, 108-2, 108-n. In several such embodiments, each of the one or more regions 108-1, 108-2, 108-n may include a set of components that is utilized to provide computational or data services. In many embodiments, networked resources 106 and/or components sets 110-1, 110-2, 110-n may include and/or utilize one or more components illustrated in FIGS. 6 and 7.

In some embodiments, networked resources 106 may provide one or more platforms to implement components, such as one or more applications and/or services. In several embodiments, components of the networked resources 106 may comprise (e.g., be utilized to implement or host) one or more of an application programming interface (API), a database, an application, a service, enterprise systems, and one or more functionalities described herein. For example, components of networked resources 106 may include configuration registry 104 and/or resiliency agent 102. In many embodiments, network components may include one or more resources, services, components, applications, systems, capabilities, and functionalities described herein.

Figure 2:
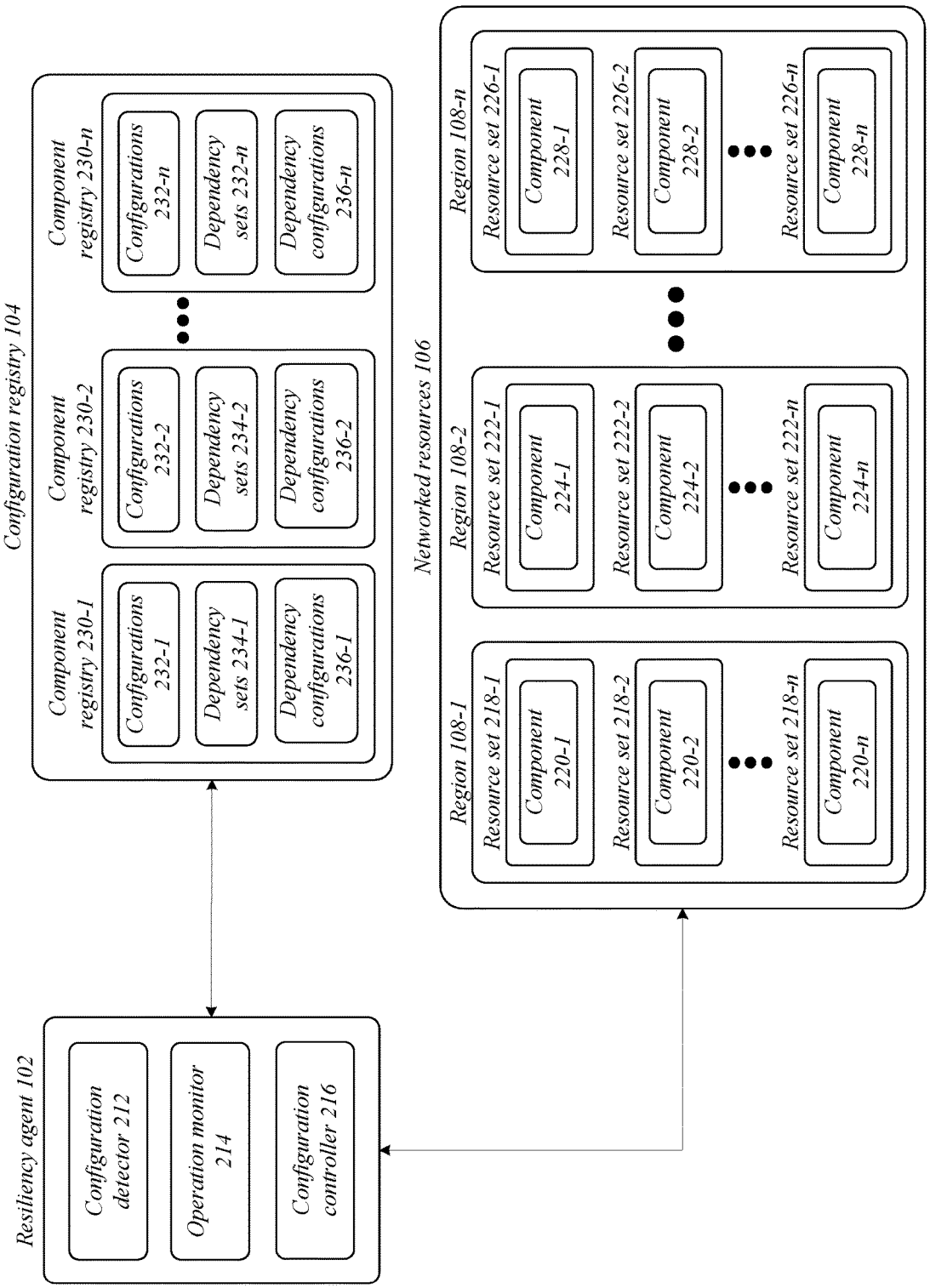
FIG. 2 illustrates an embodiment of a second operating environment according to one or more embodiments described herein.

FIG. 2 illustrates an embodiment of an operating environment 200 according to one or more embodiments described herein. Operating environment 200 may include the same or similar components as those illustrated in operating environment 100. In operating environment 200, resiliency agent 102 may include configuration detector 212, operation monitor 214, and configuration controller 216, configuration registry 104 may include one or more component registries 230-1, 230-2, 230-n, and networked resources 106 may include region 108-1 with one or more resource sets 218-1, 218-2, 218-n, region 108-2 with one or more resource sets 222-1, 222-2, 222-n, and region 108-n with one or more resources sets 226-1, 226-2, 226-n. Embodiments are not limited in this context.

In many embodiments, each of the resources sets in each region may include or be used to implement a component in a component set. For instance, resource set 218-1 of region 108-1 may implement component 220-1. In such instance, component 220-1 may be included in component set 110-1 of FIG. 1. Accordingly, in the illustrated embodiment, resource set 218-1, 218-2, 218-n of region 108-1 may implement component 220-1, 220-2, 220-n, respectively, resource set 222-1, 222-2, 222-n may implement component 224-1, 224-2, 224-n, respectively, and resource set 226-1, 226-2, 226-n may implement component 228-1, 228-2, 228-n, respectively. In various embodiments, a network component may include one or more of a region, a resource set, a component, and a component set.

In several embodiments, configuration registry 104 may include a component registry associated with each component in networked resources 106. Further, each component registry may include one or more configurations for the associated component, one or more dependency sets of the associated component, and one or more dependency configurations for the one or more dependency sets of the associated component. In many embodiments, the one or more configurations for an associated component may include one or more operational aspects/settings of the associated component. In many such embodiments, the one or more configurations for an associated component may be identified, or determined, by configuration detector 212 of resiliency agent 102.

In various embodiments, the one or more dependency sets for an associated component may include one or more dependency chains (e.g., upstream and/or downstream dependencies) of the associated component. In various such embodiments, the one or more dependency sets for the associated component may be identified, or determined, by configuration detector 212 of resiliency agent 102. In several embodiments, the one or more dependency configurations may include one or more configurations for one or more components in the dependency sets corresponding with the associated component. In several such embodiments, the one or more dependency configurations may be identified, or determine, by configuration detector 212 of resiliency agent 102.

In some embodiments, the one or more configurations may include different configurations for an associated component that correspond to different scenarios or network settings. For instance, the one or more configurations may include a first configuration for when the component is located in region 108-1 and a second configuration for when the component is located in region 108-2. Similarly, the one or more dependency sets may include different dependency chains (e.g., upstream and/or downstream dependencies) for an associated component that correspond to the different scenarios or network settings and the one or more dependency configurations may include different configurations for components of the one or more dependency sets that correspond to different scenarios or network settings. In various embodiments, configuration registry 104 may include one or more sample or target configurations for one or more components.

In the illustrated embodiment, component registry 230-1 may include configurations 232-1, dependency sets 234-1, and dependency configurations 236-1, component registry 230-2 may include configurations 232-2, dependency sets 234-2, and dependency configurations 236-2, and component registry 230-n may include configurations 232-n, dependency sets 234-n, and dependency configurations 236-n. In some embodiments and/or examples described herein, component 220-1 may be associated with component registry 230-1, component 220-2 may be associated with component registry 230-2, and component 220-*n* may be associated with component registry 230-*n*.

As previously mentioned, in operating environment, resiliency agent 102 may include configuration detector 212, operation monitor 214, and configuration controller 216. In various embodiments, configuration detector 212 may identify the configuration and/or dependencies of one or more components in networked resources 106. In several such embodiments, configuration detector 212 may store the configuration of a component as a configuration in the corresponding component registry. In some such embodiments, configuration detector 212 may store the dependencies of a component as a dependency set in the corresponding component registry. In many such embodiments, configuration detector 212 may store configurations of components in a dependency set as a dependency configuration in the corresponding component registry.

In many embodiments, the operation monitor 214 may monitor one or more functional aspects of networked resources, such as components in networked resources 106 or traffic flow. In many such embodiments, the operation monitor 214 may monitor logs to monitor one or more functional aspects of the networked resources. In various embodiments, based on monitoring of the functional aspects may enable operation monitor 214 to identify issues with network components. For instance, operation monitor 214 may monitor an error log associated with component 220-2 to identify an issue with the component 220-2.

In some embodiments, when one or more of the monitored functional aspects crosses a threshold an issue with the associated component may be identified and/or one or more corrective actions may be triggered. For example, if traffic flow to a network component spikes above a threshold, an issue with the network component may be identified. In another example, if utilization of resources implementing a component exceed a threshold an issue with the component may be identified. In some embodiments, operation monitor 214 may compare configurations identified by configuration detector 212 with sample configurations in configuration registry 104 to identify issues with an associated component.

In various embodiments, configuration controller 216 may implement and/or alter the configuration of one or more network components. For example, configuration controller 216 may implement corrective actions, such as one or more configurations in configuration registry 104, based on issues identified by operation monitor 214 and/or configuration detector 212. In many embodiments, a configuration of a network component may include one or more operational aspects/settings of a network component and/or one or more operational aspects/setting associated therewith. For example, a configuration of a network component may include traffic flow to/from the network component. In another example, a configuration of a network component may include the set of resources allocated to implement the component (e.g., resources in the resource set 218-2 to implement component 220-2). In yet another example, a configuration of a network component may include one or more addresses used to communicate with other components. In still another example, a configuration of a network component may include an address or region of the network component. In yet another example, a configuration of a network component may include one or more upstream and/or downstream dependencies of the network component.

In many embodiments, traffic routing between regions may occur as a function of percentage. In many such embodiments, at any given point in time and while multiple regions might be set up for an application, database, or API, traffic through that region is set up and governed by a percentage split rule. For example, 10% may go to a west region and 90% may go to an east region. In such examples, any spike in traffic volumes may occur as a proportion of 1:10 and within this 1:10 constraint, autoscaling may create additional instances to handle the traffic increase. However, when someone desires to move this configuration to a different cloud region issues can arise. In many embodiments, such a regional move requires supporting network components (e.g., cloud infrastructure) that is configured similarly to the 1:10 split. In many such embodiments, autoscaling may not be able to keep up, resulting in endpoint connections between the application moving and its upstream/downstream dependent systems breaking.

As will be described further below, such as with respect to FIG. 3, in one or more embodiments described herein, resiliency agent 102 may reconfigure the application to correct and/or prevent breaking of endpoint connections. In some embodiments, whenever a component moves, either wholly or in part, from one region to another, resiliency agent 102 may check for endpoint alignment, and automatically restore endpoint alignment if needed. In various embodiments, alerting and/or manual controls may be part of this process (e.g., as gatekeeper), but by automatically correcting ensures minimal disruption to the system.

Figure 3:
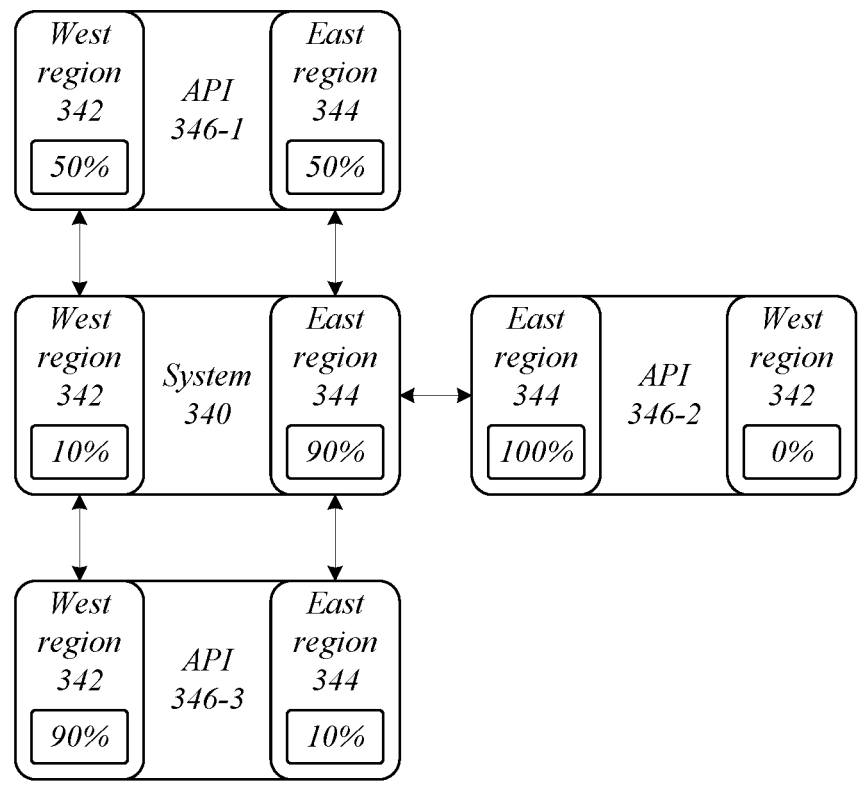
FIG. 3 illustrates exemplary aspects of a first network configuration according to one or more embodiments described herein.

FIG. 3 illustrates exemplary aspects of a network configuration 301 in environment 300 according to one or more embodiments described herein. The network configuration 301 may include system 340, API 346-1, API 346-2, and API 346-3. In some embodiments, APIs 346-1, 346-2, 346-3 may be downstream dependencies of system 340. In several embodiments, system 340 and APIs 346-1, 346-2, 346-3 may each include one or more west region components and one or more east region components. In one or more embodiments described herein, traffic flow may be split between each of the regions. In the illustrated embodiment, traffic flow to system 340 may be split with 10% going to west region 342 and 90% going to east region 344, traffic to API 346-1 may be split with 50% going to west region 342 and 50% going to east region 344, traffic to API 346-2 may be split with 0% going to west region 342 and 100% going to east region 344, and traffic to API 346-3 may be split with 90% going to west region 342 and 10% going to east region 344. Embodiments are not limited in this context.

Network configuration 301 illustrates a common setup that can cause issues when one of the regions fails. For example, if the east region fails, APIs 346-1, 346-2, 346-3 may not be able to properly adjust, resulting in the same traffic splits being implemented. In some embodiments, one or more of the APIs may include a physical network API (i.e., implemented on physical resources) or a cloud API (i.e., implemented on cloud resources). In the illustrated embodiment, API 346-1 and API 346-3 may include cloud APIs while API 346-2 may include a physical network API. In embodiments that the east region fails, API 346-1 may still only receive 50% of west traffic, and API 346-3 may still only receive 90% of west traffic. Further, API 342-2 may still be limited by whatever redundancy it had in the first place.

Accordingly, with respect to network configuration 301, if the east region 344 fails, one or more of the following can occur. The 90% east traffic for system 340 is blocked, and error logs begin manifesting. The 10% west traffic for system 340 continues to work. The physical network API 346-2, depending on its physical construction to connect to the west region of system 340, may continue to operate normally. The cloud APIs 346-1, 346-3 are a different story.

If their east regions also fail, both would experience inexplicable spikes in west traffic, causing autoscaling to handle. Meanwhile, their east traffic would suffer a drop of all system east traffic. If the cloud APIs 346-1, 346-3 cannot adjust to west, system 340 will fail event though it successfully moved to west region 342. In many embodiments, resiliency agent 102 may reconfigure one or more components, or traffic routing associated therewith, to prevent failure of system 340. For example, resiliency agent 102 may reconfigure traffic flow associated with each of the APIs such that 100% of west traffic goes to each of them.

Figure 4:
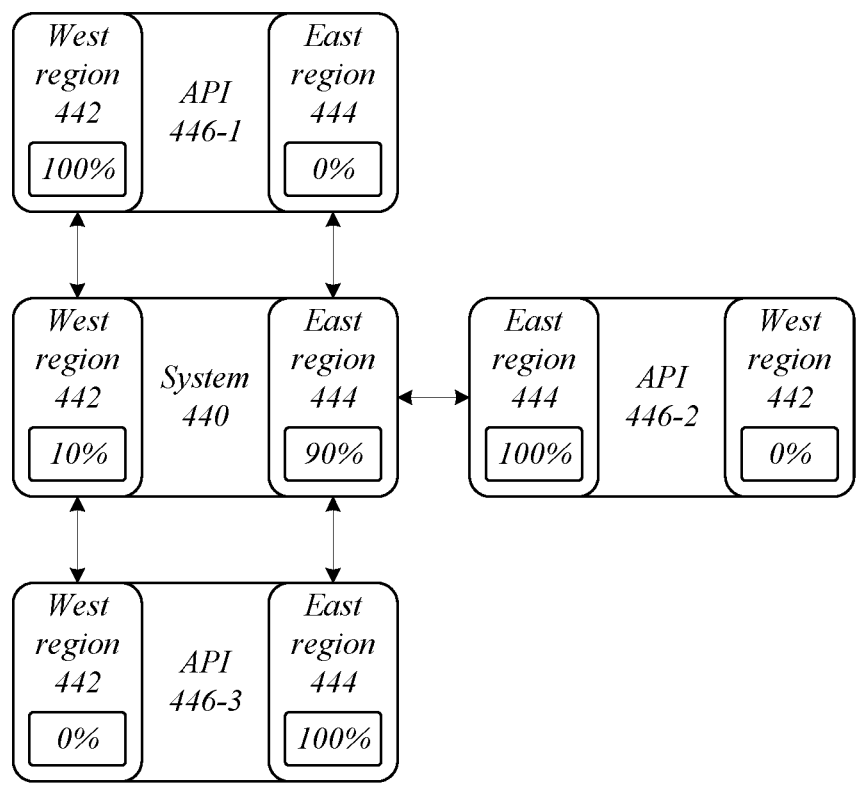
FIG. 4 illustrates exemplary aspects of a second network configuration according to one or more embodiments described herein.

FIG. 4 illustrates exemplary aspects of a network configuration 401 in environment 400 according to one or more embodiments described herein. The network configuration 401 may include system 440, API 446-1, API 446-2, and API 446-3. In some embodiments, APIs 446-1, 446-2, 446-3 may be downstream dependencies of system 440. In the illustrated embodiment, API 446-1 and API 446-3 may include cloud APIs while API 446-2 may include a physical network API. In several embodiments, system 440 and APIs 446-1, 446-2, 446-3 may each include one or more west region components and one or more east region components. In one or more embodiments described herein, traffic flow may be split between each of the regions. In the illustrated embodiment, traffic flow to system 440 may be split with 10% going to west region 442 and 90% going to east region 444, traffic to API 446-1 may be split with 50% going to west region 442 and 50% going to east region 444, traffic to API 446-2 may be split with 0% going to west region 442 and 100% going to east region 444, and traffic to API 446-3 may be split with 0% going to west region 442 and 100% going to east region 444. Embodiments are not limited in this context.

With respect to network configuration 401, if the east region 444 fails, one or more of the following can occur. System 440 moves to west region 442. The cloud API 446-1 may have a delay while autoscaling ramps up in west to handle the additional system west traffic. The cloud API 446-3, even if it has the ability to operate in the west, goes dead with the rest of the east region, and system 440 suffers errors, the event lost functionality in spite of being 100% capable in the west because its rules do not allow west traffic. In many embodiments, resiliency agent 102 may reconfigure one or more components, or traffic routing associated in addition to that, to prevent the errors associated with cloud API 446-3. For example, resiliency agent 102 may reset API endpoints and traffic configuration to accommodate any region or other traffic routing failover.

In one or more embodiments, resiliency agent 102 may detect up/down spikes in traffic and logged system errors specific to one or more of system 440 and cloud-based APIs 446-1, 446-3 and dynamically force either regional activation or failover—based on pre-configuration of the API to work in other regions—and trigger appropriate instances and autoscaling to support the failover. In various embodiments, as each endpoint is activated and its rules adapted, a downstream chain of unintended consequences may impair performance. Accordingly, resiliency agent 102 may allow these interdependent network components to be visualized at any level of their network infrastructure and/or reconnected when broken without time-consuming and expensive delays or human error.

By building a configuration table to show dependencies and registering endpoints and rules by which each is configured. Where active capability exists in any region, these will be noted along with pre-scripted code to initialize traffic rerouting and activation of appropriate regional endpoints. Additionally, the inclusion of user-initiated controls to simulate an outage or failure in any network component may allow the overall system of interdependencies to be tested for resiliency in either production or simulated production environments (e.g., a copy system). Further, operation of the resiliency agent 102 may reveal the entire interdependency chain which can then be reconstructed and compared to intended design. In other words, what breaks will show connections and highlight weak points and network risks missed by conventional human analysis.

Figure 5:
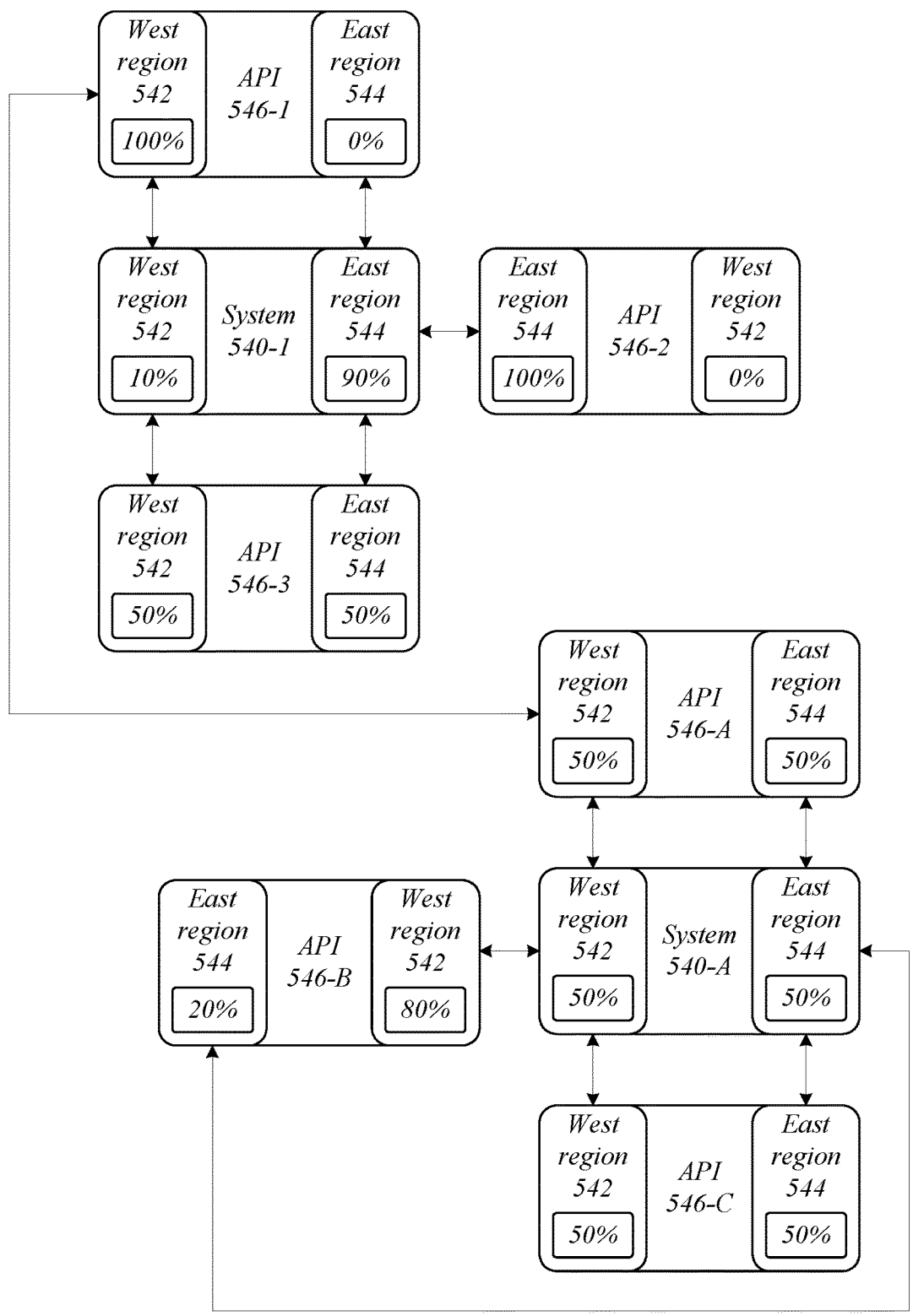
FIG. 5 illustrates exemplary aspects of a third network configuration according to one or more embodiments described herein.

FIG. 5 illustrates exemplary aspects of a network configuration 501 in environment 500 according to one or more embodiments described herein. The network configuration 501 may include system 540-1, system 540-A, and APIs 546-1, 546-2, 546-3, 546-A, 546-B, 546-C. In some embodiments, APIs 546-1, 546-2, 546-3 may be up/downstream dependencies of system 540-1 and APIs 546-A, 546-B, 546-C may be up/downstream dependencies of system 540-A. Further, API 546-1 and API 546-A may have a dependency, resulting in systems 540-1, 540-A being interdependent. In the illustrated embodiment, API 546-1 and API 546-3 may include cloud APIs while API 546-2 may include a physical network API. Similarly, API 546-A and API 546-C may include cloud APIs while API 546-B may include a physical network API. In several embodiments, systems 540-1, 540-A and APIs 546-1, 546-2, 546-3, 546-A, 546-B, 546-C may each include one or more west region components and one or more east region components. In one or more embodiments described herein, traffic flow may be split between each of the regions. Embodiments are not limited in this context.

In the illustrated embodiment, traffic flow to system 540-1 may be split with 10% going to west region 542 and 90% going to east region 544, traffic to API 546-1 may be split with 100% going to west region 542 and 0% going to east region 544, traffic to API 546-2 may be split with 0% going to west region 542 and 100% going to east region 544, and traffic to API 546-3 may be split with 50% going to west region 542 and 50% going to east region 544.

Further, traffic flow to system 540-A may be split with 50% going to west region 542 and 90% going to east region 544, traffic to API 546-A may be split with 50% going to west region 542 and 50% going to east region 544, traffic to API 546-B may be split with 80% going to west region 542 and 20% going to east region 544, and traffic to API 546-C may be split with 50% going to west region 542 and 50% going to east region 544.

By looking at what breaks and what is affected around a system of networked components, both up and downstream dependencies can be identified. Expanding on the examples of FIGS. 3 and 4, when traffic fails only in the east region 544 of system 540-1, rerouting to the west region 542 may only solve issues associated with system 540-1. However, API 546-1, which was connected to system 540-1 east region, has to have its connection rerouted to accept system 540-1 west region 542 traffic at a much higher level than before the east region 544 of system 340-1 failed. API 546-A may begin autoscaling to handle west region 544 traffic and its east region 542 essentially goes to zero.

In many embodiments, resiliency agent 102 may identify which downstream components are impacted. For example, in the illustrated embodiments, the impact to API 546-1 and API 546-2 may be identified. Further, the impact to API 546-A and API 546-C may be identified because they relate to the interdependent system 540-A. During these impacts issues, such as latency, errors (e.g., logged errors), and other effects to system components, may occur. In some embodiments, the use of dark instances, and other mechanisms (e.g., autoscaling) to offset the east region failure may be deployed.

In many embodiments, one or more network components may be mapped and/or visualized based on a configuration registry, such as one built by resiliency agent 102. This may enable the entire interdependent chain of impacts to be identified. In one or more embodiments described herein, resiliency agent may be able to identify an optimal path of what a system failure looks like. Referring back to network configuration 501, in other words, if the east region 544 fails for system 540-1, resiliency agent, 102 may correlate issues with APIs 546-1, 546-3, 546-A, 546-C to the failure of the east region 544 for system 540-1. Further, indications of the correlated issues may be stored in configuration registry 104.

In several embodiments, resiliency agent 102 may provide a tool that can dynamically recognize symptoms of autoscaling, latency, traffic spikes, CPU spikes, and the like, and dynamically reroute endpoint traffic, traffic balancing, and drive autoscaling. In various embodiments, resiliency agent 102 may move through the chain of interdependencies and take corrective measures on impacted network components. In some embodiments, resiliency agent 102 may identify that physical network APIs 546-2, 546-B were not impacted. In many embodiments, differential analysis of what, in theory, should have been impacted versus what is impacted may be used to construct best practices and new network configurations. In many such embodiments, these best practices and network configurations may be more robust and self-healing.

Figure 6:
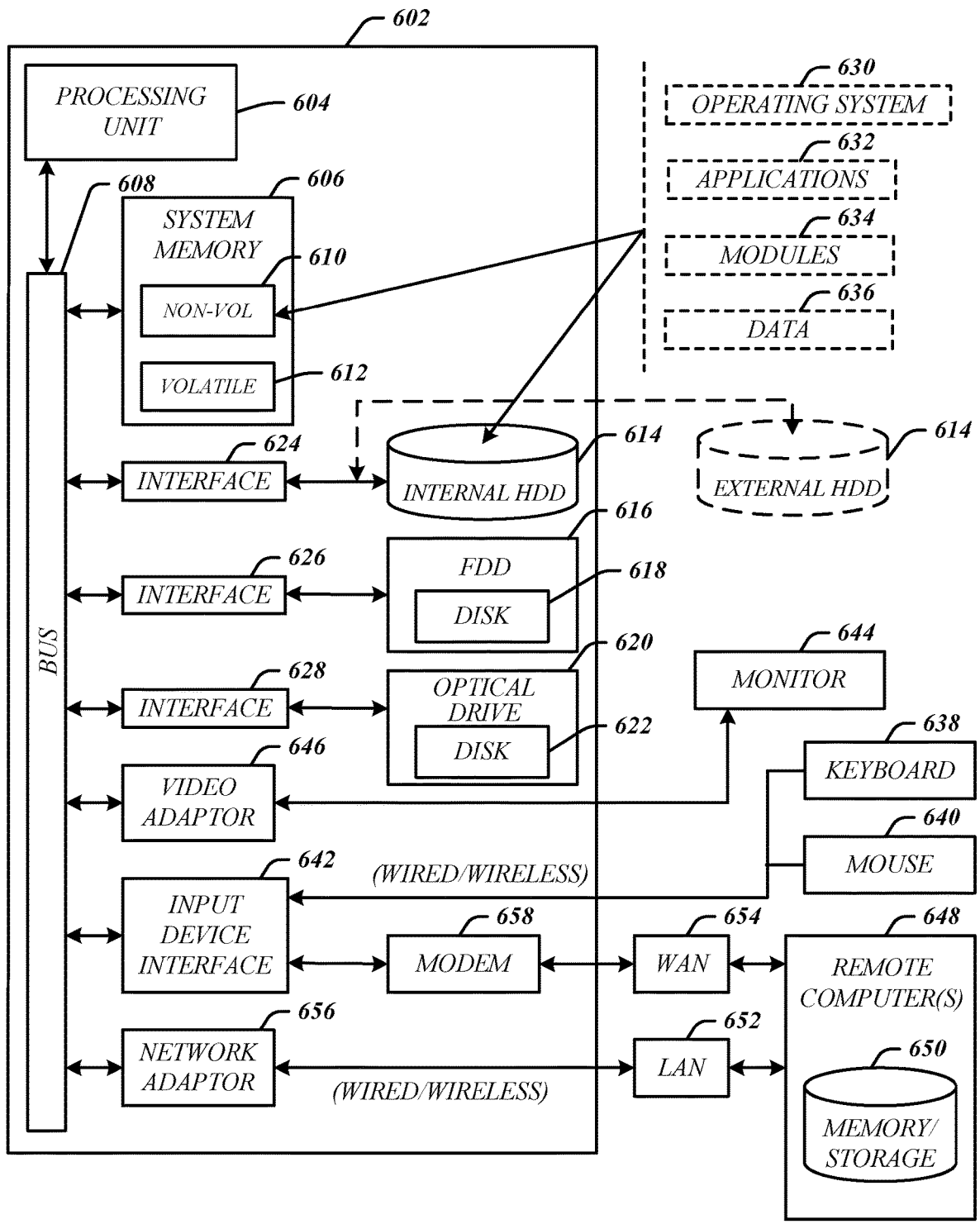
FIG. 6 illustrates exemplary aspects of a computing architecture according to one or more embodiments described herein.

FIG. 6 illustrates an embodiment of an exemplary computing architecture 600 that may be suitable for implementing various embodiments as previously described. In various embodiments, the computing architecture 600 may comprise or be implemented as part of an electronic device. In some embodiments, the computing architecture 600 may be representative, for example, of a computer system that implements one or more components described herein. In some embodiments, computing architecture 600 may be representative, for example, one or more portions, such as hardware components, of networked resources 106 that implement one or more embodiments, such as software components, described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors, including without limitation an AMD® Athlon®, Duron®, and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 604.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by an HDD interface 624, an FDD interface 626 and an optical drive interface 628, respectively. The HDD interface 624 for external drive implementations can include at least one or both of Universal Serial Bus (USB) and IEEE 994 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components described herein.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608, but can be connected by other interfaces such as a parallel port, IEEE 994 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. In various embodiments, one or more interactions described herein may occur via the networked environment. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 7:
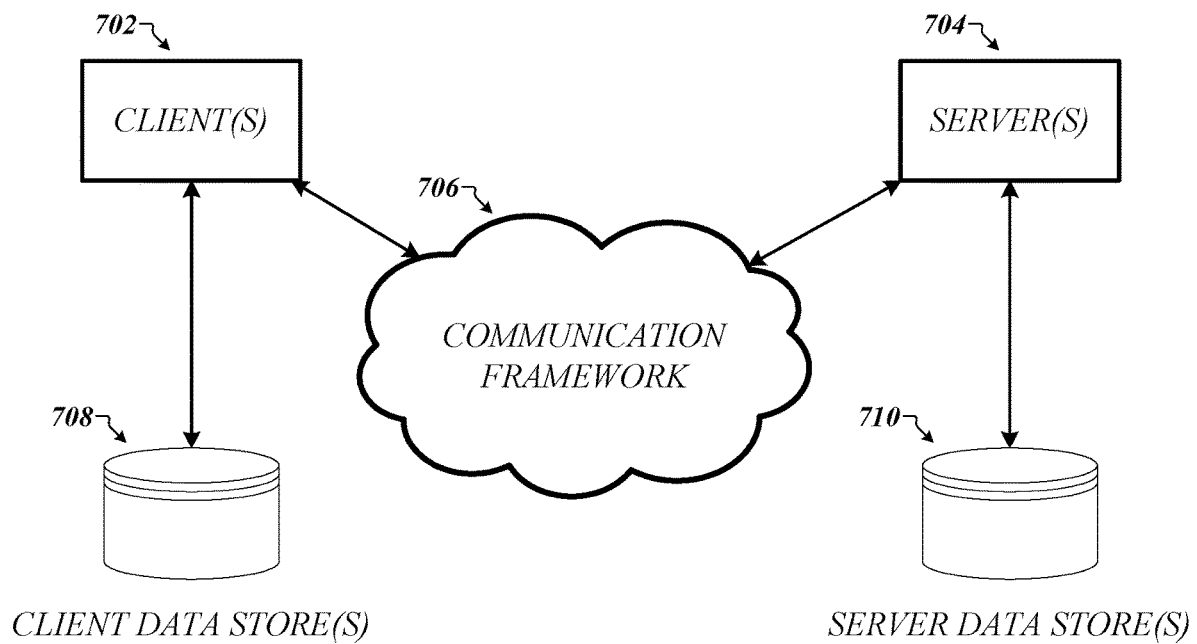
FIG. 7 illustrates exemplary aspects of a communications architecture according to one or more embodiments described herein.

FIG. 7 illustrates a block diagram of an exemplary communications architecture 700 suitable for implementing various embodiments as previously described, such as applications or services described herein. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700.

As shown in FIG. 7, the communications architecture 700 comprises includes one or more clients 702 and servers 704. The clients 702 and the servers 704 are operatively connected to one or more respective client data stores 708 and server data stores 710 that can be employed to store information local to the respective clients 702 and servers 704, such as cookies and/or associated contextual information. In various embodiments, any one of servers 704 may implement one or more of logic flows, components, functionalities, or operations described herein, and storage mediums described herein, such as in conjunction with storage of data received from any one of clients 702 on any of server data stores 710.

The clients 702 and the servers 704 may communicate information between each other using a communication framework 706. The communications framework 706 may implement any well-known communications techniques and protocols. The communications framework 706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 706 may implement various network interfaces arranged to accept, communicate, and connect to a communications network. A network interface may be regarded as a specialized form of an input-output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 702 and the servers 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine-readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. An apparatus, comprising:
a processor; and
a memory comprising instructions that when executed by the processor cause the processor to:
identify relocation of a component in a network from a first region to a second region;
determine an interruption of endpoint alignment of the component with the network due to relocation of the component from the first region to the second region; and
reconfigure the component to restore endpoint alignment with the network.

2. The apparatus of claim 1, wherein the instructions, when executed by the processor, further cause the processor to reconfigure one or more components in a chain of interdependencies associated with the component to restore endpoint alignment of the component with the network.

3. The apparatus of claim 1, wherein the component in the network comprises one or more of an application, an application programming interface, a compute instance, hardware.

4. The apparatus of claim 1, wherein the instructions, when executed by the processor, further cause the processor to perform a differential analysis to determine a best practice for reconfiguring the component to restore endpoint alignment with the network.

5. The apparatus of claim 1, wherein the instructions, when executed by the processor, further cause the processor to reconfigure a connection between the component and an upstream component in the network to restore endpoint alignment with the network.

6. The apparatus of claim 1, wherein the instructions, when executed by the processor, further cause the processor to map an interdependency chain for one or more portions of the network.

7. The apparatus of claim 6, wherein the instructions, when executed by the processor, further cause the processor to utilize differential analysis to identify one or more weaknesses in the interdependency chain.

8. The apparatus of claim 1, wherein the instructions, when executed by the processor, further cause the processor to reconfigure a connection between the component and a downstream component in the network to restore endpoint alignment with the network.

9. At least one non-transitory computer-readable medium comprising a set of instructions that, in response to execution by a processor circuit, cause the processor circuit to:
identify relocation of a component in a network from a first region to a second region;
determine an interruption of endpoint alignment of the component with the network due to relocation of the component from the first region to the second region; and
reconfigure the component to restore endpoint alignment with the network.

10. The at least one non-transitory computer-readable medium of claim 9, wherein the set of instructions, in response to execution by the processor circuit, further cause the processor circuit to reconfigure one or more components in a chain of interdependencies associated with the component to restore endpoint alignment of the component with the network.

11. The at least one non-transitory computer-readable medium of claim 9, wherein the component in the network comprises one or more of an application, an application programming interface, a compute instance, hardware.

12. The at least one non-transitory computer-readable medium of claim 9, wherein the set of instructions, in response to execution by the processor circuit, further cause the processor circuit to perform a differential analysis to determine a best practice for reconfiguring the component to restore endpoint alignment with the network.

13. The at least one non-transitory computer-readable medium of claim 9, wherein the set of instructions, in response to execution by the processor circuit, further cause the processor circuit to reconfigure a connection between the component and an upstream component in the network to restore endpoint alignment with the network.

14. The at least one non-transitory computer-readable medium of claim 9, wherein the set of instructions, in response to execution by the processor circuit, further cause the processor circuit to map an interdependency chain for one or more portions of the network.

15. The at least one non-transitory computer-readable medium of claim 14, wherein the set of instructions, in response to execution by the processor circuit, further cause the processor circuit to utilize differential analysis to identify one or more weaknesses in the interdependency chain.

16. The at least one non-transitory computer-readable medium of claim 9, wherein the set of instructions, in response to execution by the processor circuit, further cause the processor circuit to reconfigure a connection between the component and a downstream component in the network to restore endpoint alignment with the network.

17. A computer-implemented method, comprising:
identifying relocation of a component in a network from a first region to a second region;
determining an interruption of endpoint alignment of the component with the network due to relocation of the component from the first region to the second region; and
reconfiguring the component to restore endpoint alignment with the network.

18. The computer-implemented method of claim 17, comprising reconfiguring one or more components in a chain of interdependencies associated with the component to restore endpoint alignment of the component with the network.

19. The computer-implemented method of claim 17, comprising performing a differential analysis to determine a best practice for reconfiguring the component to restore endpoint alignment with the network.

20. The computer-implemented method of claim 17, comprising reconfiguring a connection between the component and an upstream component in the network to restore endpoint alignment with the network.

* * * * *